Feb. 1, 1927.
J. M. WALSH
1,615,858
HORSE COLLAR
Filed May 7, 1924
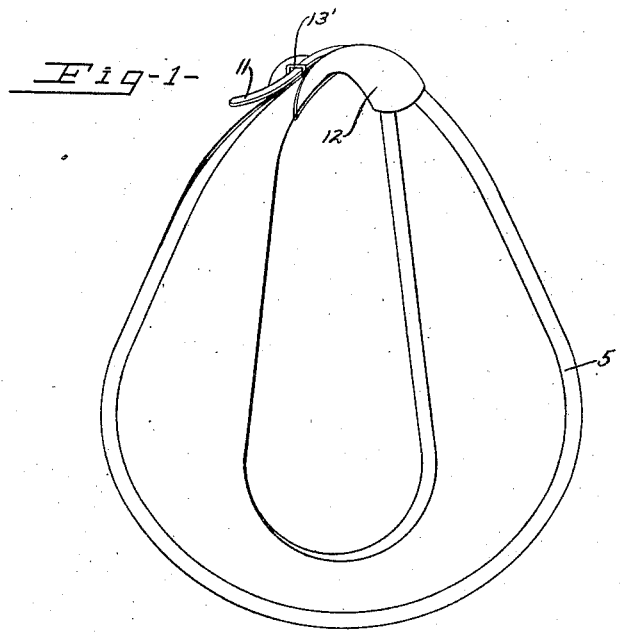
Fig-1-
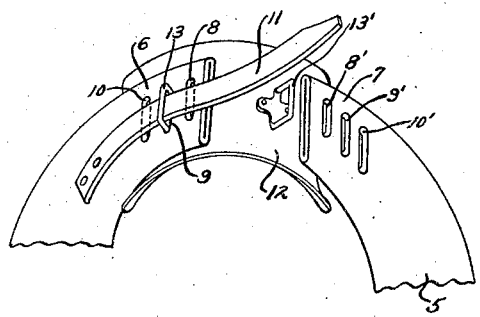
Fig-2-
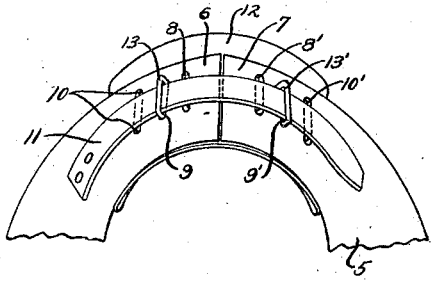
Fig-3-
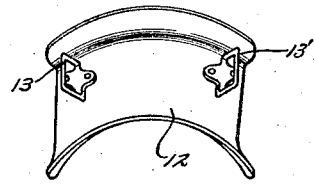
Fig-4-
INVENTOR.
James M. Walsh,
BY Morsell, Keeney & Morsell
ATTORNEYS Patented Feb. 1, 1927.

1,615,858

UNITED STATES PATENT OFFICE.

JAMES M. WALSH, OF MILWAUKEE, WISCONSIN; KITTIEBELLE F. WALSH ADMINISTRATRIX OF SAID JAMES M. WALSH, DECEASED.

HORSE COLLAR.

Application filed May 7, 1924. Serial No. 711,592.

This invention relates to improvements in horse collars, and more particularly to horse collars of an adjustable type.

Heretofore, in adjustable horse collars, it has been found necessary to employ cross straps to retain the neck pad adjacent the end portions of the collar. This construction has not proven entirely satisfactory in that portions of the collar bulge, and it is practically impossible to insure a correct positioning of the pad so that it will hug the collar. Also, in the form of collar referred to, when adjustments are made, the position of the neck pad with respect to the neck of the animal is varied so that it will not be centrally positioned. Hence, it is one of the objects of the present invention to provide an adjustable horse collar in which the above objections are eliminated, as are other objections common to the form of adjustable collar generally in use.

A further object of the invention is to provide a horse collar in which the ordinary form of buckle and apertured strap connecting means is eliminated.

A further object of the invention is to provide a collar which can be easily adjusted as the horse gains or loses weight.

A further object of the invention is to provide a collar which can be adjusted to fit a horse in the spring when he is soft and fat, and then later in the season as the animal works off flesh, the collar can be made smaller to fit the animal perfectly, eliminating the possibility of galls and boils.

A further object of the invention is to provide a collar adapted for breaking colts in that it can be let out from time to time, increasing in size as the colt grows.

A further object of the invention is to provide a collar well adapted for horses hard to fit, and superior to expensive made-to-order collars, the present collar being constructed to permit three adjustments thereby making it an easy matter to fit the same properly.

A further object of the invention is to provide a collar which can be used to equal advantage with or without a sweat pad, it being possible to let the collar out when a sweat pad is used, and when the same is discontinued, the collar can again be adjusted back to proper size.

A further object of the invention is to provide a horse collar which is of very simple construction, is strong and durable, and is well adapted for the purpose described.

With the above and other objects in view, the invention consists of the improved adjustable horse collar and its parts and combinations as set forth in the claims, and all equivalents thereof.

In the accompanying drawing in which the same reference characters indicate the same parts in all of the views:

Fig. 1 is a plan view of the improved adjustable horse collar;

Fig. 2 is a fragmentary perspective view showing the collar ends disconnected;

Fig. 3 is a view similar to Fig. 2 but showing the ends secured together; and

Fig. 4 is a perspective view of the neck pad.

Referring now more particularly to the accompanying drawing, it will be seen that the numeral 5 indicates the improved horse collar, the same being formed of leather or other suitable material sufficiently padded or stuffed and shaped in the form of a yoke.

The invention relates particularly to the means employed to adjustably and disconnectibly secure the adjacent collar end portions 6 and 7 together, the said portions being considerably less padded than the remainder of the yoke member. Each of the end portions 6 and 7 are provided with a plurality of spaced apertures or slots 8, 8', 9, 9', 10 and 10'. One of the end portions, as 6, has riveted thereto, a collar billet 11 of sufficient length to overlap the other portion 7, as shown.

A neck pad 12 is further provided, the same having a concave upper surface and being shaped to fit an animal's neck, as clearly shown in Fig. 4. The neck pad is normally unsecured to the yoke portion 5 of the collar and a pair of spaced apart eyelets 13 and 13' are secured to the upper surface thereof. The collar is initially fastened and the pad secured in position by passing the eyelets through two opposite slots as 9 and 9'. The billet 11 is then run through the eyelets thereby securing together the end portions of the yoke in adjusted position and also securely and unmovably holding the neck pad thereto, as shown in Fig. 3. It is evident that the engagement between the billet and eyelets causes the upper surface of the neck pad to tightly hug the under surface of the yoke portions, and this position is maintained at all times rendering unnecessary the use of cross straps for that purpose.

After the initial adjustment of the collar and pad, when removing the collar from the horse, it is only necessary to withdraw the billet from one of the eyelets, as shown in Fig. 2. The angular disposition of the eyelets makes it easy to disengage an eyelet from its slot as it is merely necessary to swing the yoke end portion outwardly. When the collar is thus removed, the pad member remains attached to the yoke and it is never necessary to change said attachment, except when varying the initial adjustment of the collar.

Obviously, the various slots provide for different adjustments of the collar to permit it to be made larger or smaller, as desired. In the form of collar illustrated in the drawing, three different adjustments may be attained. By passing the eyelets through the end slots 8 and 8', the largest adjustment of the collar is made possible. The intermediate slots 9 and 9' afford a middle adjustment, and the slots 10 and 10' permit the smallest adjustment of the collar.

As was mentioned heretofore, the neck pad 12 is unsecured to the yoke portion of the collar except by the engagements between the eyelets, slots and billet. By this arrangement, when the collar is to be adjusted, only the end portions of the yoke are moved with respect to each other and the neck pad is at all times stationary and remains in one position. In this way, the curvature and position of the neck pad is in no way affected by adjustments in size of the collar.

From the foregoing description, it will be seen that the improved adjustable horse collar is of very simple and novel construction, and is well adapted for the purpose set forth.

What I claim as my invention is:

1. An adjustable collar for horses and the like, comprising a yoke shaped member having adjacent spaced-apart and non-overlapping end portions, a plurality of slots formed in each of said end portions, a loose, curved neck pad underlying said adjacent end portions, a pair of spaced apart eyelets secured to the outer surface of said neck pad, each of said eyelets being insertable through any one slot in one end portion to attach the neck pad thereto and to adjust the size of the yoke member, and a billet secured to one of said yoke end portions and insertable through said eyelets to disengageably lock the neck pad to the yoke and to hold the end portions in spaced relation.

2. An adjustable collar for animals, comprising a yoke shaped member having adjacent end portions, a plurality of slots formed in each of said end portions, a loose, curved neck pad underlying said adjacent end portions, a pair of spaced apart eyelets secured to the outer surface of said neck pad, each of said eyelets being insertable through any one slot in one end portion to attach the neck pad thereto and to adjust the size of the yoke member, and a billet secured to one end of said yoke end portions and insertable through said eyelets to disengageably lock the neck pad to the yoke and to hold the end portions in spaced relation.

In testimony whereof, I affix my signature.

JAMES M. WALSH.